United States Patent [19]
Bell

[11] Patent Number: 5,170,202
[45] Date of Patent: Dec. 8, 1992

[54] CONTRAST-BASED AUTOFOCUS MECHANISM

[75] Inventor: Cynthia S. Bell, Webster, N.Y.

[73] Assignee: Eastman Kodak Company, Rochester, N.Y.

[21] Appl. No.: 548,451

[22] Filed: Jul. 3, 1990

[51] Int. Cl.$^5$ .............................................. G03B 13/36
[52] U.S. Cl. .................................,................ 354/402
[58] Field of Search ................ 354/402, 406, 407, 408

[56] References Cited

U.S. PATENT DOCUMENTS

| | | | |
|---|---|---|---|
| 3,691,922 | 9/1972 | Konig et al. | 354/402 |
| 4,473,287 | 9/1984 | Fukuhara et al. | 354/409 |
| 4,568,168 | 2/1986 | Sakai et al. | 354/402 |
| 4,609,944 | 9/1986 | Nakada et al. | 354/102 |
| 4,768,052 | 8/1988 | Hamada et al. | 354/402 |
| 4,825,239 | 4/1989 | Suda et al. | 354/402 |

OTHER PUBLICATIONS

The Auto Focus Technology A Stimulant of Ever Expanding 35mm Photography by: Naomichi Fujita-pp. 101-116.

*Primary Examiner*—Russell E. Adams
*Attorney, Agent, or Firm*—Edward Dugas

[57] ABSTRACT

A contrast autofocus mechanism for a still camera automatically controls the displacement of an imaging lens (10) so as to cause an image of a subject (32) to be quickly brought into focus upon the len's image-receiving plane (24) in response to successive contrast measurements taken at different conditions which produce different depths of field. The change in depth of field may be accomplished by changing the aperture setting for successive contrast measurements. Based upon difference in contrast for the two measurements, the extent to which the lens is out-of-focus is calculated. This calculation is used to define the displacement of the lens to a new position which should be at or nearly at a position of peak contrast. If at the new position further refinement is necessary, a trial and error subroutine is conducted to determine in which direction the lens should be moved to attain focus. In addition, during this contrast measurement, the amount by which the lens is to be displaced in the correct direction is calculated and the lens is displaced to what should be an in-focus condition. To accommodate low contrast scenes an auxiliary default position measurement sequence may be carried out to determine when focus has been achieved or is incapable of being achieved. For each set of contrast measurements a blur circle (b') difference value, representative of the difference in contrast, is compared with thresholds to determine in which direction the lens should be moved.

33 Claims, 9 Drawing Sheets

CONTRAST-BASED AUTOFOCUS MECHANISM

FIELD OF THE INVENTION

The present invention relates in general to a camera autofocus mechanism and is particularly directed to a scheme for automatically adjusting the focus of a still camera lens in response to successive contrast measurements taken at different aperture or focal length settings.

BACKGROUND OF THE INVENTION

The continuing popularity and growth of still and motion photography among professionals and amateurs has led to the development of a number of automated features, probably the most significant of which is automatic focussing. While there are severally accepted autofocus techniques, contrast autofocus is one of the more commonly used, particularly in many video cameras and camcorders. In a contrast autofocus system a motor driven displacement mechanism axially translates the camera lens to achieve a precise focussing position in response to a comparison of successive through-the-lens images on a solid state imager at an equivalent film plane. Specifically, this technique compares repetitive image samples which are taken as the lens position is changed. When the camera is not focussed on any subject, the sample image is blurred and therefore low in contrast. Displacing the lens to bring the subject into focus reduces the blurring and thus increases the contrast in the image.

The problem with conventional contrast autofocus schemes is that they usually require many measurements of contrast, so that the lens will be driven until it is displaced past optimum focus whereupon the contrast begins to degrade; the lens is then driven back in the opposite direction towards the peak contrast (sharpest contrast) point. This inability to continually and rapidly displace the lens to optimum focus is due to the fact that conventional contrast autofocus schemes lack a mechanism for determining, at the outset, in which direction to move the lens to attain focus and how far away the current lens position is from achieving focus. Although other autofocus techniques, correlation autofocus in particular, overcome some of these problems, they require additional customized optics in order to create two, split images, plus twice the light level to successfully operate, conditions that are not always acceptable.

SUMMARY OF THE INVENTION

In accordance with the present invention, there is provided a new and improved contrast autofocus technique which varies conditions under which successive image readings are taken, making use of the depth of field property of the lens to achieve a rapid, stepwise convergence of the lens displacement operation to the optimum (sharpest contrast) 'in-focus' condition. Specifically, the present invention is directed to a scheme for automatically controlling the displacement of a still camera focussing lens so as to cause an image of a subject to be quickly brought into focus upon the lens's image-receiving plane in response to successive contrast measurements taken at different imaging conditions which produce different depths of field.

Pursuant to a first embodiment of the present invention, the change in depth of field is accomplished by changing the aperture setting for successive contrast measurements. Based upon the difference in contrast between successive measurements, the extent to which the lens is out-of-focus is calculated. This calculation is used to define the displacement of the lens to a new position which should be at or nearly at a position of peak contrast. If, at the new position, further refinement is necessary, a trial and error subroutine is executed in order to determine in what direction the lens is to be moved to attain focus. In addition, during this third contrast measurement the amount by which the lens is to be displaced in the correct direction is calculated and the lens is displaced to what should be an in-focus condition. To accommodate low contrast scenes (e.g. the case of a blank wall), an auxiliary default position measurement sequence may be carried out. For each set of contrast measurements, differences in contrast between successive measurements (either due to a change in aperture setting or a change in focal length) yield a blur circle difference value (representative of the difference in contrast). This blur circle difference is compared with a respective threshold value associated with predetermined position errors in the focussing position of the lens, in order to determine in which direction the lens should be moved. A third threshold associated with a prescribed absolute system-dependent value is employed to determine when focus has been achieved or is incapable of being achieved.

Pursuant to a second embodiment of the invention, where the camera has a variable focal length lens, such as a zoom lens system, the change in depth of field may be accomplished by changing the focal length of the lens for successive contrast measurements. Again, based upon the difference in contrast between successive measurements, the extent to which the lens is out-of-focus is estimated and the estimate is used to define the displacement of the lens to a new position close to peak contrast. At each new position to which the lens is displaced, the focal length is changed so as to iteratively change its depth of field to bring the focussing position of the lens into coincidence with the position of the subject.

DETAILED DESCRIPTION

Figure 1:
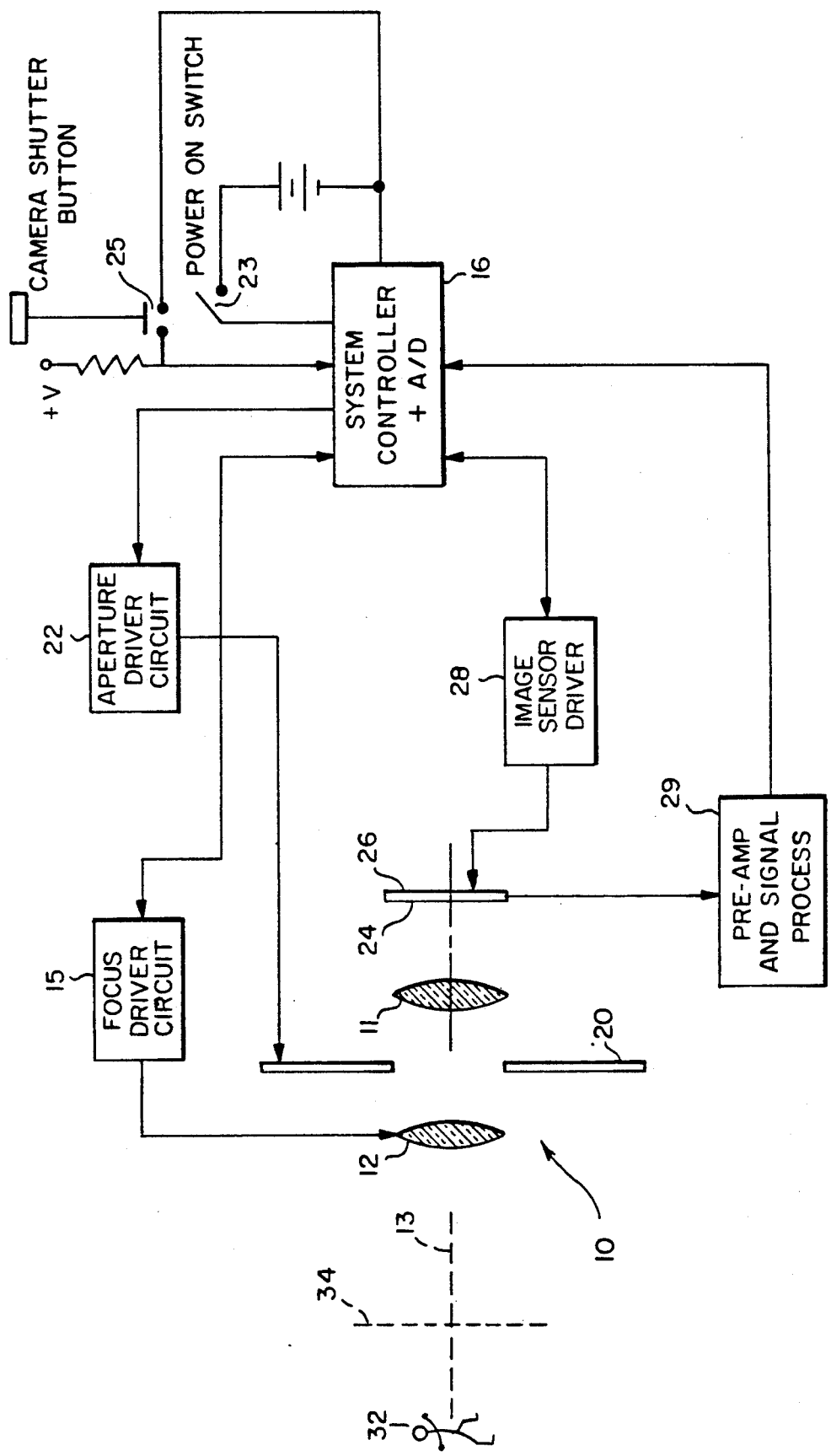
FIG. 1 diagrammatically shows general system configuration of an autofocus camera embodying the depth of field adjustment mechanism of the present invention.

Before describing in detail the particular improved contrast autofocus mechanism in accordance with the present invention, it should be observed that the present invention resides primarily in a novel lens positioning control mechanism for a still camera and makes use of conventional electrically controlled actuators for lens displacement and F-stop adjustment and not in the particular detailed configurations of the components of the camera hardware. Accordingly, the structure, control and arrangement of such a conventional lens displacement components and associated control circuits have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Referring now to FIG. 1, a general system configuration of an autofocus camera embodying the depth of field adjustment mechanism of the present invention is diagrammatically illustrated as comprising an imaging lens 10 having a fixed lens element 11 and a displaceable lens element 12 the position of which is controllably displaceable in the direction of arrows A along the optical axis 13 of the imaging lens by means of a focus driver 15 under the control of an associated system microcontroller 16. Operator control of the camera is effected by means of a conventional power on switch 23 and camera shutter button 25, which are coupled to I/O ports of the microcontroller. (Microcontroller 16 comprises customary microprocessor, associated memory and A-D, D-A interface components for controlling the operation of dedicated I/O devices with which it is ported. As the architecture and operation of such components are conventional they will not be presented here. Instead, in the description to follow, the control mechanism through which microcontroller stepwise adjusts the aperture setting and focus of the imaging lens will be set forth in detail.)

Associated with imaging lens 10 is a variable aperture stop 20, the aperture or F-stop setting (F/#) of which may be controllably adjusted by means of an aperture driver 22 under the control of microcontroller 16. Axially displaced from lens 10 is an image receiving plane 24, whereat an image capture medium 26, such as a photographic film or an optoelectronic transducer, is positioned to monitor images focussed by imaging lens 10. In a through-the-lens configuration, such as a single lens reflex camera, the image capture medium is typically located at an imaging plane physically offset from the camera's film plane and, as such, may be by way of a quick return mirror (not shown) provided for the purpose. Where image capture medium takes the form of an optoelectronic transducer, a charge-coupled device (CCD), such as an interline CCD image sensor photodiode array unit, No. KAI-0280 manufactured by Eastman Kodak Co., Rochester, N.Y., may be employed. Sensor 26 is conditioned and scanned via an image sensor driver 28 under the control of microcontroller 16. Its output signals are coupled via a preamplifier and signal conditioning unit 29 for application to microcontroller unit 16. As will be described below the signals of interest here are those indicative of the contrast in successive images for different depth of field conditions.

As pointed out briefly above, the contrast autofocus technique of the present invention varies conditions under which successive image readings are taken, making use of the depth of field property of the lens, to achieve a rapid, stepwise convergence of the lens displacement operation to an optimum (sharpest contrast) 'in-focus' condition. In particular, the contrast autofocus mechanism of the present invention varies either the aperture setting (F-stop setting (F/#)) or the focal length (f) (e.g. in the case of a zoom lens camera) of the camera in order to exploit depth of field (DOF) which is typically defined as a function of each of these variables by the expression:

$$DOF = k(F/\#)/f^2,$$

where k is proportionality constant.

Figure 2:
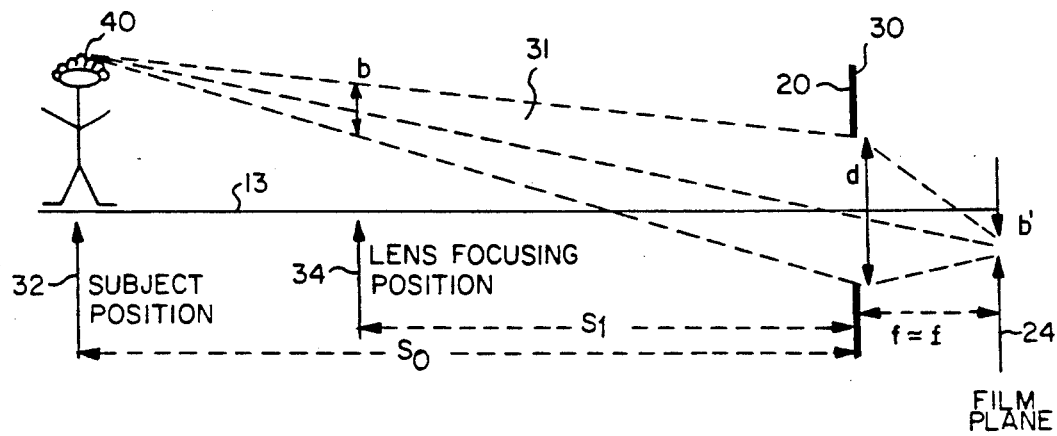
FIG. 2 diagrammatically illustrates the geometry of a camera and a subject to be focussed on an image receiving plane.

In order to facilitate an understanding of the use of the depth of field property to implement the contrast autofocus mechanism of the present invention, it is useful to examine the relevant geometry of the camera by means of the diagrammatic illustration of FIG. 2. In FIG. 2, the position of the camera's imaging lens is denoted by a lens plane 30, which is located a distance S0 from the position of a subject 32. That portion of the lens plane 30 which receives light rays 31 from subject 32 is delimited by a variable stop 20 integral with the lens, so as to define an aperture width d in the lens plane. The camera's image receiving (film) plane 24 is spaced apart from lens plane 30 by a distance f' which is approximately equal to the focal length f of the lens. In the diagrammatic illustration of FIG. 2, the actual focussing position 34 of the lens (namely, a plane which contains point sources of light that are focussed on the lens's image receiving plane) is depicted as being offset in front of the subject by a distance S1 from lens plane 30, so that focussing position 34 is short of the distance needed to focus a sharp image of the subject upon image receiving plane 24.

Whenever there is an out-of-focus condition, such as in the geometry example of FIG. 2, there is a spread or dispersion of light rays 31 emanating from a point source 40 on the subject 32 over a region denoted by spread or blur dimension b at focussing position 34. Lens 10 focusses blur region b as a corresponding blurred image region b' (hereinafter denoted as a blur circle) on image receiving plane 24. Because contrast is reduced as an image becomes more out of focus (larger sized blur circle b') and is increased as the size of the blur circle b' decreases, then by effecting a change in the depth of field which results in a change in the size of the blur circle (change in contrast), it is possible to derive information indicative of the relative positions of the focussing position 34 (which is known from the lens position) and the position of the subject (which is unknown). From this relationship, the distance S0 to the subject can be determined so that the lens may be displaced by the amount necessary to bring the subject into a sharp focus.

More particularly, the amount of contrast in a received image is comprised of the contrast in the scene itself, camera system degradation resulting from effects such as lens flare, and the out-of-focus condition of the imaging lens corresponding to the separation of the lens focusing position 34 from the plane of the subject 32. Scene dependency of contrast can be handled by controlling the autofocus system on the basis of blur differences rather than absolute blur values. Moreover, system degradation is constant for a given system and can be taken into account when setting control parameters (threshold values) of the autofocus mechanism. Consequently, as will be described in detail below, the contrast-dependent autofocus mechanism can be reduced to a determination of the relative positions of the lens and the subject.

More particularly, from the geometry of FIG. 2, the following relationships apply:

$$F = f/d \tag{1}$$

$$(F/\#1)/(F\#/2) = d1/d2 = b'1/b'2 \tag{2}$$

$$b/(S0-S1) = d/S0 \text{ for } S0 > S1 \tag{3a}$$

$$b/(S1-S0) = d/S0 \text{ for } S1 > S0 \tag{3b}$$

$$b/S1 = b'/f \text{ for all } S1 >> f \tag{4}$$

(which holds true in substantially all photographic conditions, except macro photography).

Rearranging equation (4):

$$b' = fb/S1 \tag{5}$$

Substituting for b, using equations (1) and (3), b' may be defined as:

$$b' = f^2(S0-S1)/FS0S1 \text{ for } S0 > S1 \tag{5a}$$

$$b' = f^2(S1-S0)/FS0S1 \text{ for } S1 > S0 \tag{5b}$$

Figure 3:
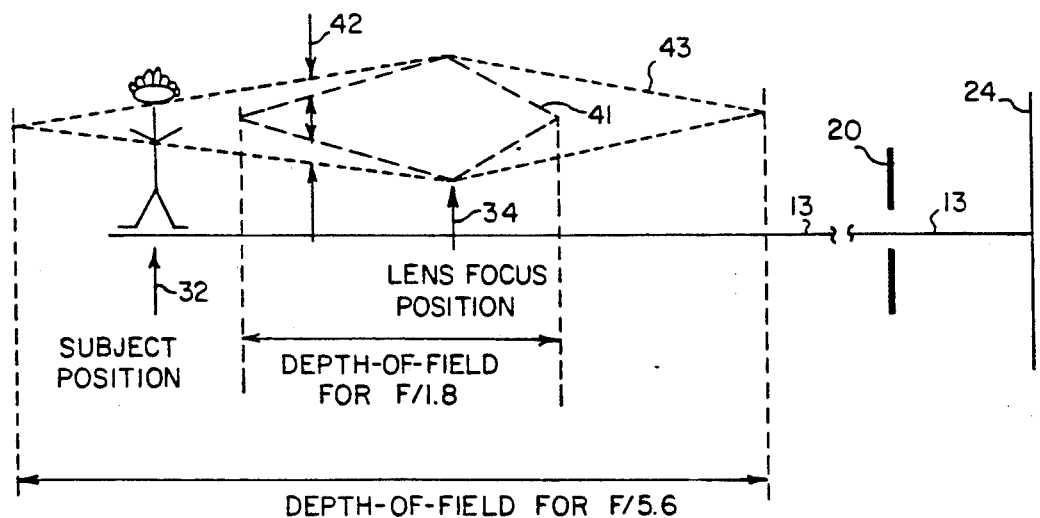
FIG. 3 diagrammatically shows a difference in the depth of field of a lens with respect to a subject as aperture size is changed.

When the aperture size (F/#) is changed, there is a difference in the depth of field as diagrammatically shown in FIG. 3 which, in turn, produces a difference in blur circle size. For the illustrated example of a given aperture opening corresponding to an F-stop value of F/1.8, the depth of field 41 of the lens falls entirely in front of the subject and at an arbitrary plane 42 has a width W41 and slope SL41. Changing the Fstop value of the aperture size to F/5.8 produces a larger depth of field 43 that overlaps the subject and at plane 42 has a width W43 and slope SL431. These differences in depth of field provide a mechanism for estimating the position of the subject (i.e. distance S0), so that the imaging lens, the position of which is known, may be moved to bring its focusing position 34 into coincidence with the subject.

Specifically, from the foregoing expressions (5a) and (5b) for blur circle size, at a given position lens position (a given focal length f), for two different aperture sizes (F-stop settings) F1 and F2, the following relationships for blur circle size may be defined:

$$b'(1) = f^2(S0-S1)/F(1)S0S1 \text{ and} \tag{6}$$

$$b'(2) = f^2(S0-S1)/F(2)S0S1. \tag{7}$$

The difference in contrast Dc in the received image for the two aperture settings is proportional to the difference between these values as:

$$Dc = k_{system}\{b'(1) - b'(2)\} \tag{8}$$

Substituting equations (6) and (7) into equation (8) yields:

$$Dc = k_{system}\{f^2(S0-S1)/F1S0S1 - f^2(S1-S0)/F1S0S1\} \tag{9}$$

$$Dc = k_{system}f^2\{1/F1 - 1/F2\}\{(S0-S1)/S0S1\} \tag{10}$$

Since $k_{system}f^2\{1/F1 - 1/F2\}$ is a constant, denotable, for example as a value C, equation (10) may be rewritten as:

$$Dc/C = 1/S1 + 1/S0 \tag{11}$$

From equation (11) expressions for the unknown distance to subject S0 may be defined as:

$$S0 = S1C/(C - S1Dc) \text{ for } S0 > S1 \tag{12}$$

$$S0 = S1C/(C + S1Dc) \text{ for } S1 > S0 \tag{13}$$

In equations (12) and (13), since C is a constant for a given camera and a given set of F/#s, and since the lens focusing position S1 is known, the distance to the subject S0 can be determined by measuring the difference in contrast Dc and applying the measured data to the above expressions. The value S0 may either be calculated directly or, in accordance with a preferred embodiment, may be determined from a look-up table.

Figure 4:
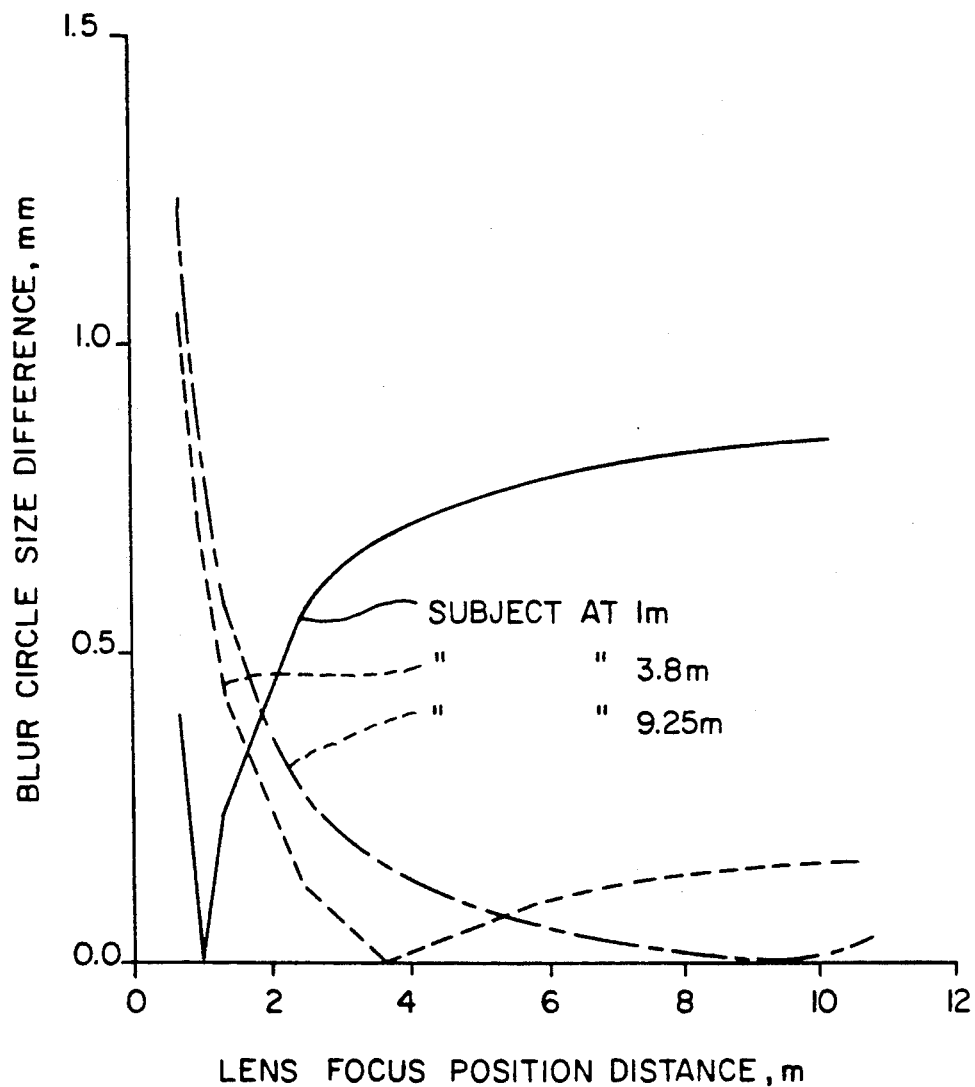
FIG. 4 graphically illustrates the manner in which blur circle size changes for different subject positions over the focussing range of the camera.

The manner in which blur circle size (and expected contrast) changes for different subject positions over the focussing range of the camera can be calculated from equations (5) and is graphically illustrated in FIG. 4. It is to be observed that the largest differences in blur circle size occur when the lens in grossly out-of-focus immediately in front of the subject.

Figure 5:
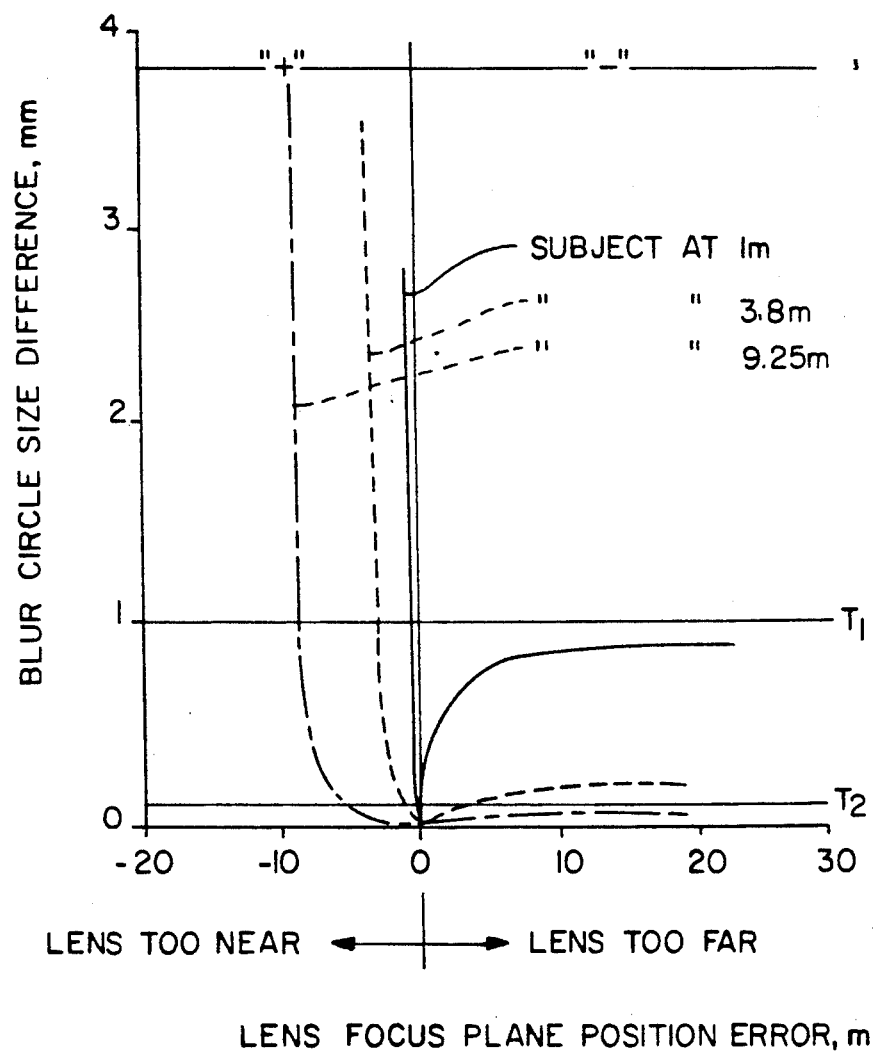
FIG. 5 graphically illustrates the variation in blur circle size difference with lens-to-subject position error.

FIG. 5 graphically illustrates the variation in blur circle size difference with lens-to-subject position error. As noted above from equations (12) and (13), the difference in measured contrast Dc is indicative of blur circle size difference. For example, in FIG. 5, the arc of data points labelled 'lens @2.5 m' corresponds to data obtained with the lens focussed at a distance of 2.5 m.

Figure 6:
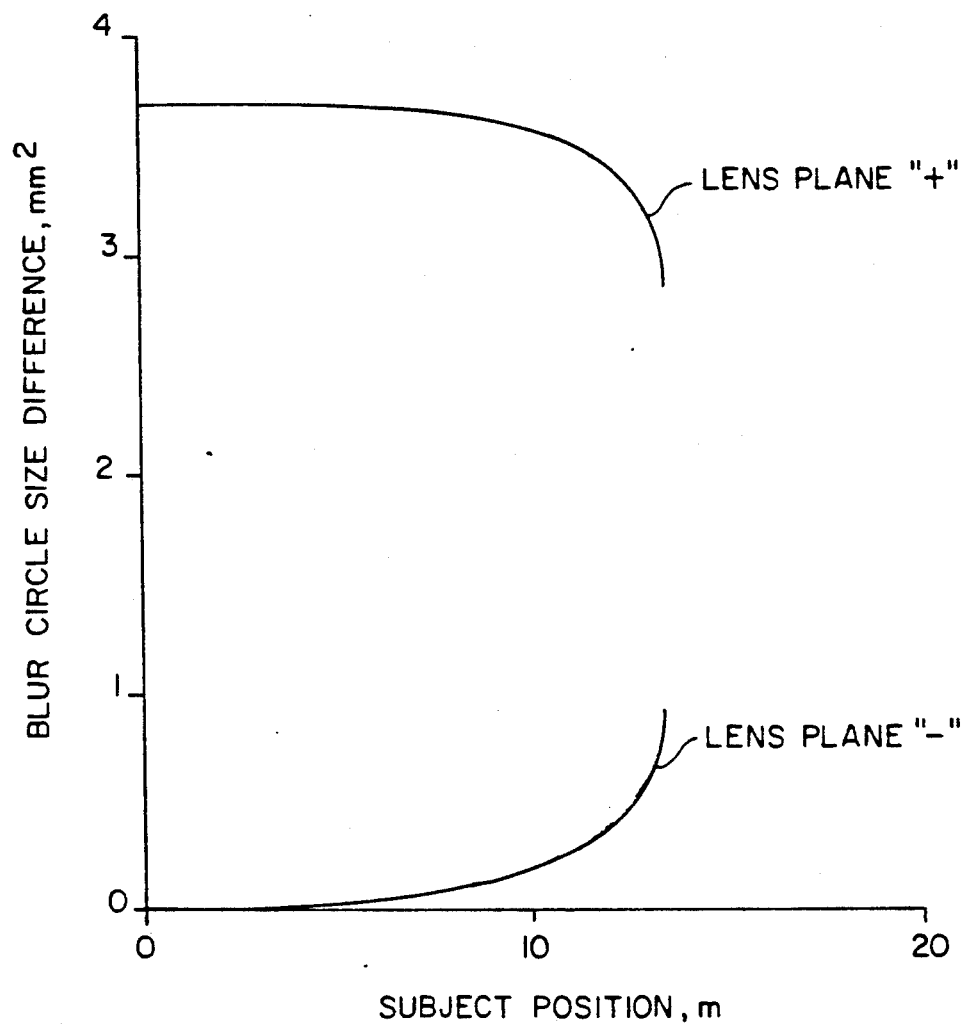
FIG. 6 graphically illustrates a pair of arcs in the relationship between blur circle size difference and subject position.

When employing measured contrast data to derive distance to the subject S0, only one of equations (12) and (13) must be employed and the choice will depend upon whether the lens is focussed in front of (+) or behind (−) the subject, which may be graphically represented by the pair of arcs illustrated in the relationship between blur circle size difference and subject position shown in FIG. 6. In order to make the correct choice, the contrast measurement is evaluated to determine if it is so large (i.e. greater than a first threshold T1 shown in FIG. 5) that the position error is obvious. If it is not obvious, then it is necessary to make a further contrast measurement at a second lens position, as will be described below. This additional reading will indicate in which direction the lens should be moved to bring the subject into focus.

Figure 7:
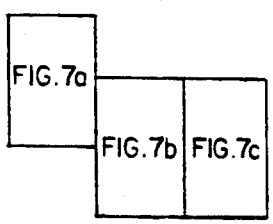
FIGS. 7, 7A, 7B, and 7C are flow charts of the contrast measurement signal processing mechanism in accordance with the present invention.
Figure 7A:
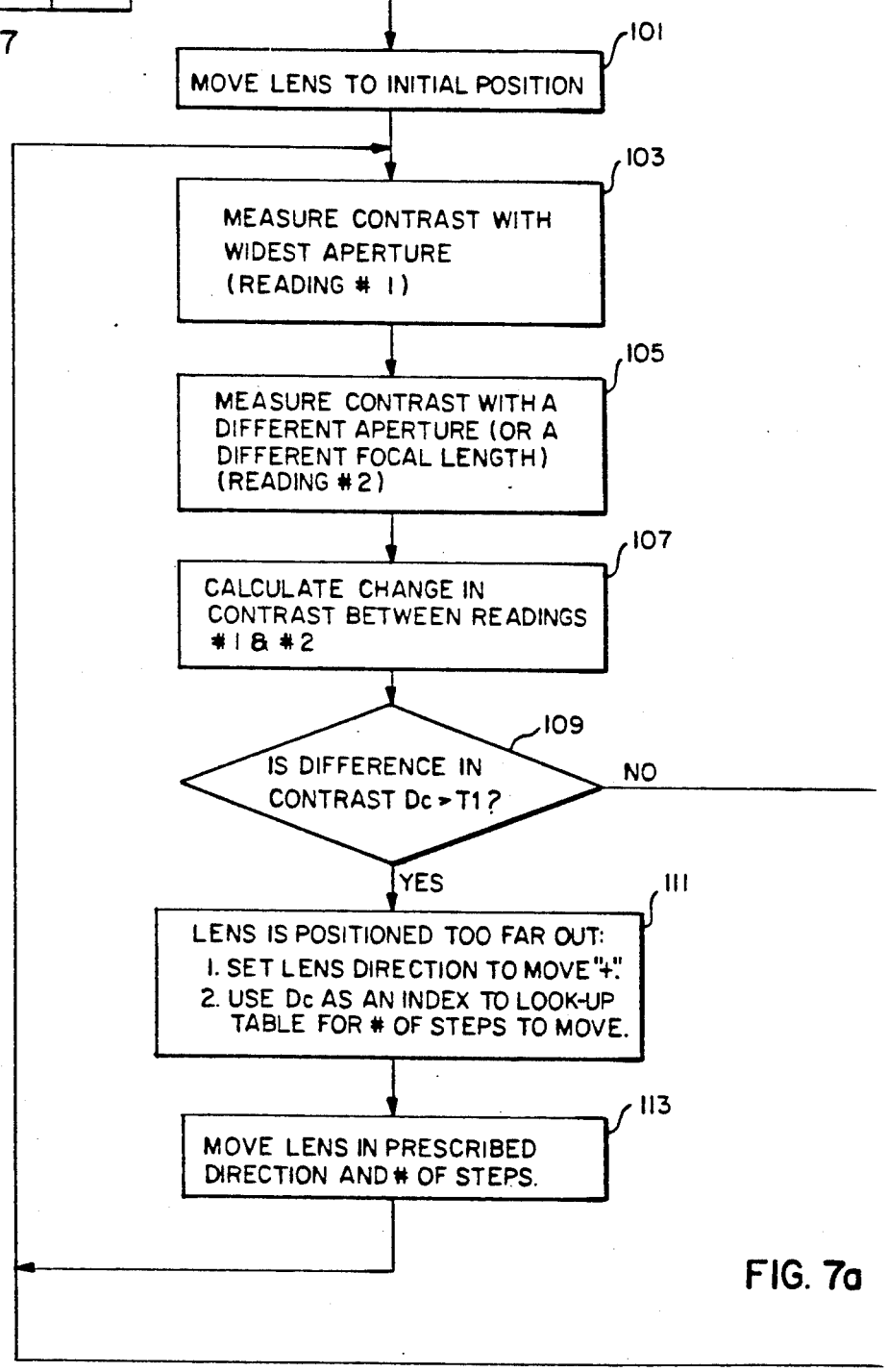
Figure 7B:
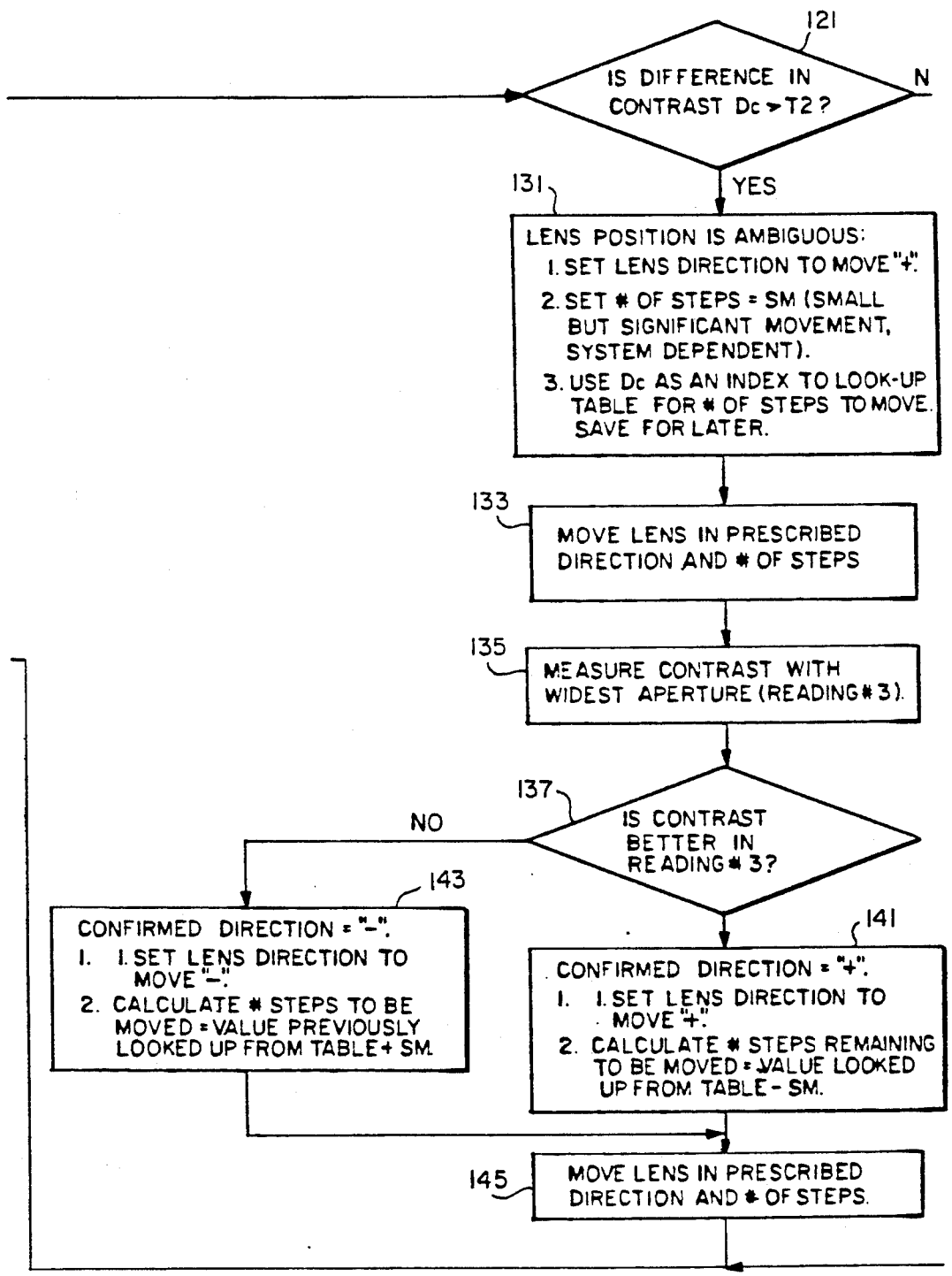
Figure 7C:
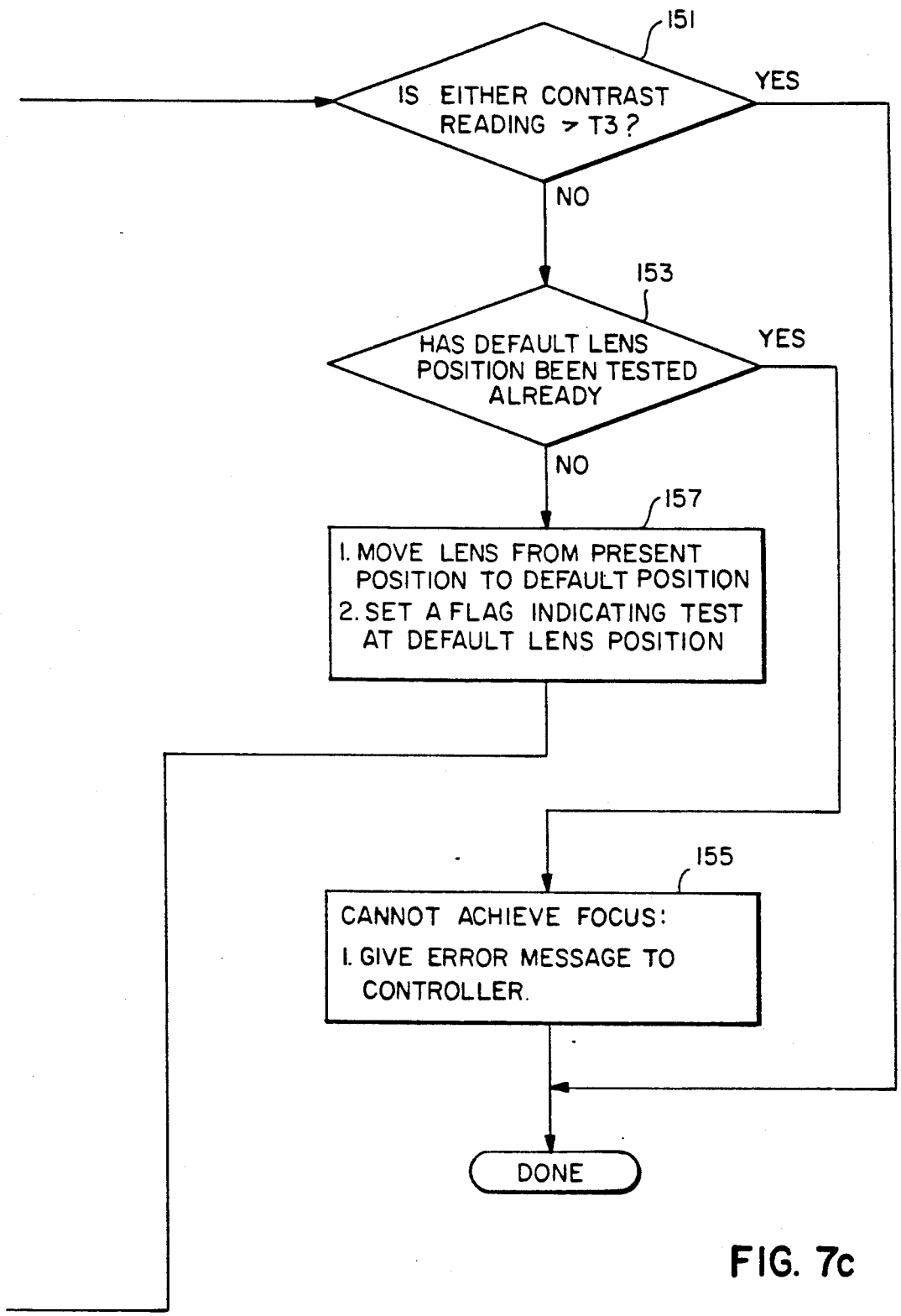

Referring now to FIG. 7, which is a flow chart of the contrast measurement signal processing mechanism in accordance with the present invention, the process begins by driving moveable lens element 12 to a prescribed starting position (e.g. focussed at infinity) at step 101. The lens viewing aperture is initially set at its widest opening and a first contrast measurement Ml is conducted at step 103. The contrast measurement itself may be carried out by generating a histogram of the intensities of a matrix of image locations on imaging plane 24. In the case of a solid state imaging array 26, intensity values of each of the output signals from the receiving photodiode matrix are quantized by the microcontroller's associated A-D converter to a prescribed resolution (e.g. eight bits, or 256 quantization levels) and the quantized data is totalled.

Figure 8:
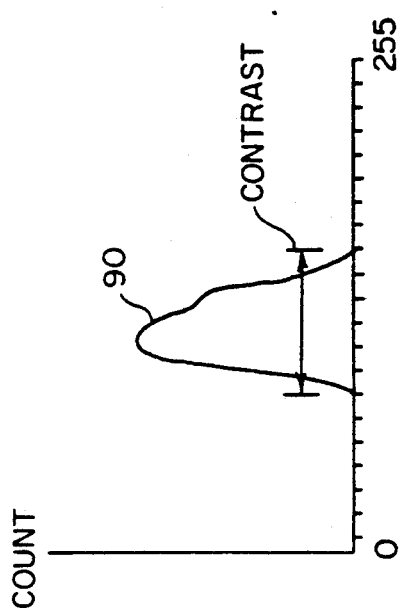
FIGS. 8–11 show respective examples of histograms for different focus conditions of the lens.
Figure 9:
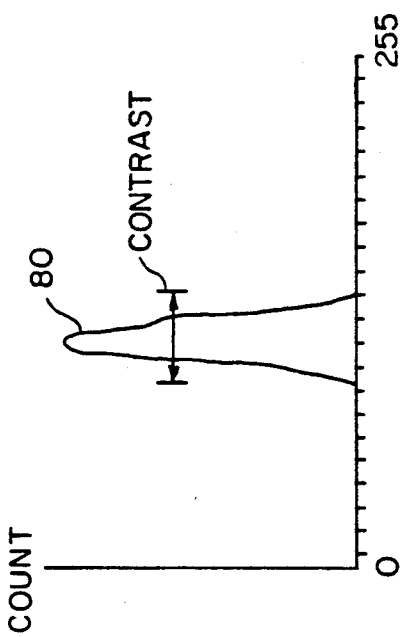
Figure 10:
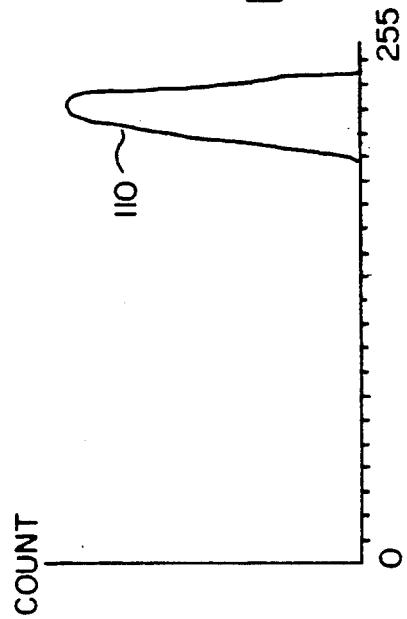
Figure 11:
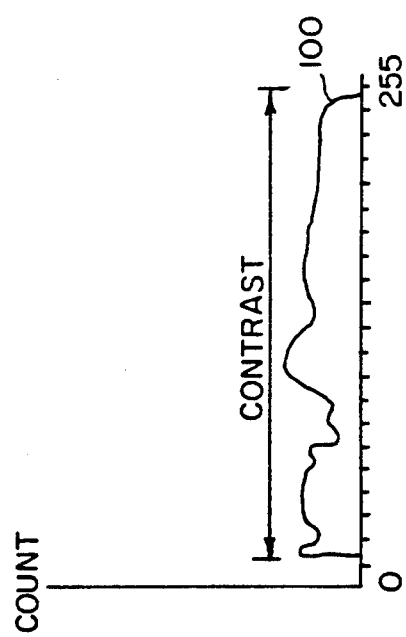

FIGS. 8-11 show respective examples of histograms for different focussing conditions of the lens. A typical histogram 80 of an out-of-focus image captured with a small depth of field (large F/#) is shown in FIG. 8. Here the contrast range is narrow with the characteristic centered around an average gray level. Increasing the depth of field (decreasing the F/#) will cause a spreading out of the contrast measurement M2 as shown at histogram 90 in FIG. 9, as the focus of the image is somewhat improved, but not at its final sharpness. The histograms of both wide and narrow aperture settings will look alike when the lens is focussed on the subject. This in-focus condition is illustrated by histogram 100 in FIG. 10, which shows a broad spread in the tonal range of the quantizer. FIG. 11 illustrates a histogram 110 where the scene is likely a single tone and is either in focus or unfocusable.

In step 105 the aperture size is reduced from its widest opening and a second contrast measurement M2 is conducted. In step 107 the difference Dc between the two contrast measurements M1 and M2 obtained in steps 103 and 105 is calculated. Then, in step 109, this contrast difference Dc is compared with a first threshold T1 level to determine whether the initial focussing position of the lens is too close (well in front of the position of the subject) and needs to be displaced farther away from the camera. This first threshold T1 is graphically shown in FIG. 5 as being located at a blur circle (contrast) difference (b') value slightly larger than the maximum value possible on the 'close' or (−) side of the characteristic. If the contrast value exceeds threshold T1 there is no uncertainty that the lens focus position is to be moved farther away from the camera (toward the (+) side of the characteristic).

Assuming that the answer to step 109 is YES, the process proceeds to step 111 wherein the lens is displaced to bring its focussing position closer to the subject and by an amount determined by the measured contrast difference value Dc in accordance with equation (13). As pointed out above in connection with the derivation of equations (12) and (13), the value S0 may either be calculated directly or may be determined from a look-up table. In a preferred embodiment, the measured contrast Dc is combined with the distance information S1 and the system parameters through which constant C is currently defined to generate an address for accessing a lens displacement look-up table to obtain a value representative of the magnitude of the displacement (e.g. some number of incremental stepping pulses to focus driver 15) of lens 12, which value is estimated to bring the focussing position of the lens into coincidence with the subject. In step 113, the lens is displaced by this value and the process returns to step 103, so that steps 103-109 are repeated.

With the focussing position of the lens now displaced closer to the subject and by an amount which has been estimated to make the lens distance S1 effectively equal to the subject distance S0, the newly measured contrast difference (blur circle size) should be considerably less than the T1 threshold (e.g. close to zero). As a consequence, the answer to step 109 is NO and the process proceeds to step 121, wherein the measured contrast difference is compared to a second threshold T2 which, as shown in FIG. 5, is very close to zero, namely at a predefined acceptable error for blur circle size. If the lens has been displaced in step 113 to be coincident with the subject, the answer to step 121 is NO and the process proceeds to step 151 wherein each of the measured contrast values M1 and M2 is compared with a third threshold T3 representative of a prescribed absolute contrast level.

Specifically, the third threshold level T3 is employed to distinguish scenes which are largely dark or light. Threshold T3 is an absolute contrast minimum and is established in accordance with system parameters including quantization level, imaging resolution and sensitivity, lens flare, lens resolving power, etc. If either contrast exceeds this third threshold T3 (the answer to step 151 is YES) then the subject is in focus and the process is complete (DONE).

Returning to step 121, if the answer is NO, indicating that the contrast difference is somewhere between the upper threshold T1 and the lower threshold T2 shown in FIG. 5, meaning that the lens focussing position is ambiguous (it is close to the subject but needs to be moved either closer to or farther away from the camera to achieve focussing position/subject coincidence), then the process proceeds to step 131, which begins a trial and error subroutine to determine on which side of the subject the focussing position of the lens is currently located.

In step 131, it is assumed that the focussing position of the lens is in front of (−) the subject, so that it must be moved farther away from (+) the camera. Lens driver 15 is then pulsed by a predetermined small number of displacement steps Sm (step 133), dependent upon camera system parameters, so as to move the lens focussing position a small but discernible distance away from the camera. Next, in step 135, the aperture setting is again set at its widest opening and a third contrast measurement M3 is taken. In step 137 contrast measurement value M3 is compared with contrast measurement value M1 obtained in step 103. If the measurement M3 obtained from step 135 is larger, namely the contrast at the new lens position is improved, then the assumed direction of movement (+) toward the camera is confirmed and the process proceeds to step 141.

In step 141, the previously derived difference Dc between the first and second contrast measurements is used as an index to the look-up table to derive a displacement value that would have been necessary to move the lens from its previous position to an in-focus location. Since the lens has already been displaced (in step 133) by an initial trial value Sm, it is necessary to 'back out' or subtract this displacement from the output of the look-up table. Thus, the displacement value will be set equal to the output of the table minus the value Sm, as shown at step 141. Lens driver 15 is then pulsed in step 145 and the process returns to step 103.

If the contrast measurement value M3 obtained in step 135 is smaller than the first measurement value M1, indicating that the contrast is worsened, then the assumed direction of movement (+) is determined to be incorrect and the process proceeds to step 143. In step 143, the direction of movement of the lens is reversed from its previously assumed direction and is therefore set to be (−). In step 143, the previously derived difference Dc between the first and second contrast measurements is also used as an index to the look-up table to derive a displacement value that would have been necessary to move the lens from its previous position to an in-focus location. Since the lens has already been displaced (in step 133) in the wrong direction by value Sm, it is necessary to 're-inject' or add subtract this displacement to the output of the look-up table. Thus, the displacement value will be set equal to the output of the table plus the value Sm, as shown at step 143. Lens driver 15 is then pulsed in step 145 and the process returns to step 103.

As a result of either the two contrast measurement and displacement sequence of steps 103-111 or the three step contrast and measurement and displacement sequence of steps 103-145, the lens is stepwise displaced to a position where the contrast difference is less than the second threshold T2 (the answer to step 121 is NO). As noted earlier, if either measured contrast value exceeds a prescribed absolute third threshold T3 (the answer to step 151 is YES), the lens is now in focus and the process is terminated. However, it may be possible that the image is that of a largely dark or light scene (e.g. a blank wall). In this case (the answer to step 151 is NO), it is necessary to conduct a further set of measurements at prescribed 'default position' of the lens (e.g. at its the hyperfocal distance) to confirm the possibility. Namely, in step 153 the inquiry is made as to whether a set of contrast measurements as described above (beginning with step 103) have been carried out at the default position. If such measurements have been carried out and there has been no improvement in the contrast at the default position, then it is concluded in step 155 that the lens cannot achieve focus and an error message 'ERROR-NO FOCUS' is generated. If such measurements have been not been carried out (the answer to step 153 is NO), then the lens is displaced to the default location, a default position flag is set (step 157) and the process returns to step 103 with the default position as the starting position. Through the repeated process, either focus will be achieved or an error message generated.

In the foregoing description of the differential contrast autofocus mechanism of the present invention the variable in base equations (5a) and (5b) is the aperture setting or F-stop number (F/#). In accordance with a second embodiment of the invention, where the camera has a variable focal length lens, such as a zoom lens system, the change in depth of field may be accomplished by changing the focal length of the lens for successive contrast measurements. Again, as in the first embodiment described above based upon the difference in contrast for the two successive contrast measurements, the extent to which the lens is out-of-focus is estimated and the estimate is used to define the displacement of the lens to a new position which should be reasonably close to peak contrast. For each new position to which the lens is displaced, the focal length is changed so as to iteratively converge to the position of the subject. Thus the process flow for the second embodiment is identical to that shown in FIG. 7 except that in steps 103, 105 and 135 the focal length rather than aperture setting is changed.

As will be appreciated from the foregoing description, the improved contrast autofocus technique in accordance with the present invention, by making use of ability to change depth of field of the lens to vary conditions under which successive image readings are taken, is able to achieve a rapid, stepwise convergence of the lens displacement operation to an optimum (sharpest contrast) 'in-focus' condition. Depth of field may be varied by change in aperture setting or focal length of the imaging lens. Since multiple measurements can be made before moving the lens to a new position and since, from such measurements, a reasonably accurate estimate of where the lens should be moved to achieve focus can be determined, then when the lens is moved it can usually be expected to be in-focus. In most cases, only one, if any, additional contrast measurement and displacement sequence may be required.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed is:

1. For use with a camera having a focussing lens and a variable aperture through which light from a subject passes, and is incident upon an image-receiving plane, at which there is disposed a two-dimensional image capture sensor, from which a captured image of a subject is derived, a method of adjusting said lens so as to cause an image of said subject to be focussed upon said two-dimensional image capture sensor disposed at said image-receiving plane comprising the steps of:

(a) for a first position of said lens and a first aperture setting of said variable aperture, measuring the contrast in a first image of said subject formed on said two-dimensional image capture sensor disposed at said image-receiving plane;

(b) thereafter, for said first position of said lens and a second subsequent aperture setting of said variable aperture, measuring the contrast in a second image of said subject formed on said two-dimensional image capture sensor disposed at said image-receiving plane; and (c) controllably adjusting said focussing lens in accordance with the difference in contrast measured in succesive steps (a) and (b), so as to improve the sharpness of focus of the image of said subject formed on said two-dimensional image capture sensor disposed at said image-receiving plane.

2. A method according to claim 1, wherein step (c) comprises:

(c1) measuring the difference in contrast measured in steps (a) and (b), and (c2) in response to the difference in contrast measured in step (c1) being greater than a first threshold value, adjusting said focussing lens so as to improve the sharpness of focus of the image of said subject on said two-dimensional image capture sensor disposed at said image-receiving plane.

3. A method according to claim 2, wherein step (c) further includes the steps of:

(c3) in response to the degree of contrast measured in step (c1) being no greater than a second threshold value, determining whether the contrast measured in either of steps (a) or (b) is greater than a third threshold, (c4) in response to either of the contrasts measured in steps (a) and (b) being greater than said third threshold, terminating the adjustment of said focussing lens.

4. A method according to claim 2, wherein step (c) further includes the steps of:

(c3) in response to the degree of contrast measured in step (c1) being greater than a second threshold value, determining the direction in which said lens should be moved to bring said subject into focus upon said two-dimensional image capture sensor disposed at said image receiving plane and moving said lens by an amount which causes said subject to be focussed upon said two-dimensional image capture sensor disposed at said image receiving plane.

5. A method according to claim 4, wherein step (c3) comprises:
   c3-1) moving said lens in a first direction to a second position, by an amount dependent upon the difference in contrast measured in step (c1),
   (c3-2) for said second position of said lens and said first aperture setting of said variable aperture, measuring the contrast in a third image of said subject formed on said two-dimensional image capture sensor disposed at said image-receiving plane, and
   (c3-3) moving said lens either in first direction or in a second direction opposite to said first direction, in dependence an improvement in the contrast measured in step (c3-3), to a third position at which said subject is brought into focus upon said two-dimensional image capture sensor.

6. A method according to claim 2, wherein said first threshold is defined in accordance with a relationship between contrast and position error in the focussing position of said lens.

7. A method according to claim 3, wherein said first and second thresholds are defined in accordance with a relationship between contrast and position error in the focussing position of said lens.

8. A method according to claim 7, wherein said third threshold is defined in accordance with one or more parameters of said camera.

9. A method according to claim 2, wherein step (c) further includes the steps of:
   (c3) in response to the degree of contrast measured in step (c1) being no greater than a second threshold value, determining whether the contrast measured in either of steps (a) or (b) is greater than a third threshold,
   (c4) in response to neither of the contrasts measured in steps (a) and (b) being greater than said third threshold, moving said lens to a default position and repeating steps (a) and (b) for said default position,
   (c5) measuring the difference in contrast measured in step (c4), and
   (c6) in response to the difference in contrast measured in step (c5) being no greater than said first and second threshold values and in response to either of the contrast values measured in step (c4) being greater than a third threshold, generating an error signal indicative of an inability to focus said lens upon said subject.

10. For use with a camera having a focussing lens the position of which relative to a two-dimensional image capture element disposed at an image-receiving plane is controllably adjustable and a variable aperture through which light from a subject and directed by said focussing lens onto said two-dimensional image capture element disposed at said image-receiving plane passes, a method of adjusting the position of said lens so as to cause an image of said subject to be focussed upon said two-dimensional image capture sensor disposed at said image-receiving plane comprising the steps of:
   (a) for a first position of said lens and a first aperture setting of said variable aperture, obtaining a first measurement of contrast in a first image of said subject formed on said two-dimensional image capture sensor disposed at said image-receiving plane;
   (b) changing one of the focal length of said lens and aperture setting of said variable aperture and obtaining a second measurement of contrast in a second image of said subject formed on said two-dimensional image capture sensor disposed at said image-receiving plane; and
   (c) controllably adjusting said focussing lens in accordance with the difference in said first and second measurements of contrast, successively obtained in steps (a) and (b) so as to improve the sharpness of focus of the image of said subject formed on said two-dimensional image capture sensor disposed at said image-receiving plane.

11. A method according to claim 10, wherein step (c) comprises
   (c1) deriving an estimate of the degree to which the image of said subject formed on said two-dimensional image capture sensor disposed at said image-receiving plane is out-of-focus in accordance with the difference in contrast measurements obtained in steps (a) and (b),
   (c2) determining a displacement of said focussing lens for effectively bringing the image of said subject into focus on said two-dimensional image capture sensor disposed at said image-receiving plane, and
   (c3) adjusting the position of said lens from said first position to a second position in accordance with the displacement determined in step (c2).

12. A method according to claim 10, wherein step (c) comprises:
   (c1) measuring the difference in contrast measured in steps (a) and (b), and
   (c2) in response to the difference in contrast measured in step (c1) being greater than a first threshold value, controllably displacing said focussing lens so as to improve the sharpness of focus of the image of said subject on said two-dimensional image capture sensor disposed at said image-receiving plane.

13. A method according to claim 12, wherein step (c) further includes the steps of:
   (c3) in response to the degree of contrast measured in step (c1) being no greater than a second threshold value, determining whether the contrast measured in either of steps (a) or (b) is greater than a third threshold,
   (c4) in response to either of the contrasts measured in steps (a) and (b) being greater than said third threshold, terminating the adjustment of said focussing lens.

14. A method according to claim 12, wherein step (c) further includes the steps of:
   (c3) in response to the degree of contrast measured in step (c1) being greater than a second threshold value, determining the direction in which said lens should be moved to bring said subject into focus upon said two-dimensional image capture sensor disposed at said image receiving plane and moving said lens by an amount which causes said subject to be focussed upon said two-dimensional image capture sensor disposed at said image receiving plane.

15. A method according to claim 14, wherein step (c3) comprises:
   (c3-1) moving said lens in a first direction to a second position, by an amount dependent upon the difference in contrast measured in step (c1), (c3-2) for said second position of said lens and said first aperture setting of said variable aperture, measuring the contrast, in a third image of said subject formed on said two-dimensional image capture sensor disposed at said image-receiving plane, and (c3-3) moving said lens either in said first direction or in a second direction opposite to said first direction, in dependence an improvement in the contrast measured in step (c3-3), to a third position at which said subject is brought into focus.

16. A method according to claim 12, wherein said first threshold is defined in accordance with a relationship between contrast and position error in the focussing position of said lens.

17. A method according to claim 13, wherein said first and second thresholds are defined in accordance with a relationship between contrast and position error in the focussing position of said lens.

18. A method according to claim 17, wherein said third threshold is defined in accordance with one or more parameters of said camera.

19. A method according to claim 12, wherein step (c) further includes the steps of:

(c3) in response to the degree of contrast measured in step (c1) being no greater than a second threshold value, determining whether the contrast measured in either of steps (a) or (b) is greater than a third threshold, (c4) in response to neither of the contrasts measured in steps (a) and (b) being greater than said third threshold, moving said lens to a default position and repeating steps (a) and (b) for said default position, (c5) measuring the difference in contrast measured in step (c4), and (c6) in response to the difference in contrast measured in step (c5) being no greater than said first and second threshold values and in response to either of the contrast values measured in step (c4) being greater than a third threshold, generating an error signal indicative of an inability to focus said lens upon said subject.

20. For use with a camera having a focussing lens the position of which relative to a two-dimensional image capture sensor disposed at an image-receiving plane is controllably adjustable and a variable aperture through which light from a subject and directed by said focussing lens onto said two-dimensional image capture sensor disposed at said image-receiving plane passes, a method of adjusting the position of said lens so as to cause an image of said subject to be focussed upon said two-dimensional image capture sensor disposed at said image-receiving plane comprising the steps of:

(a) for a first position of said lens and a first aperture setting of said variable aperture, obtaining a first measurement of contrast in a first image of said subject formed on said two-dimensional image capture sensor disposed at said image-receiving plane;

(b) changing one of the focal length of said lens and aperture setting of said variable aperture, so as to effectively increase the depth of field in the image of said subject on said image-receiving plane and obtaining a second measurement of contrast in a second image of said subject formed on said two-dimensional image capture sensor disposed at said image-receiving plane; and (c) controllably adjusting said focussing lens in accordance with the difference in said first and second measurements of contrast, successively obtained in steps (a) and (b) so as to improve the sharpness of focus of the image of said subject formed on said two-dimensional image capture sensor disposed at said image-receiving plane.

21. A method according to claim 20, wherein step (c) comprises (c1) deriving an estimate of the degree to which the image of said subject formed on said two-dimensional image capture sensor disposed at said image-receiving plane is out-of-focus in accordance with the difference in contrast measurements obtained in steps (a) and (b), (c2) determining a displacement of said focussing lens for effectively bringing the image of said subject into focus on said two-dimensional image capture sensor disposed at said image-receiving plane, and (c3) adjusting the position of said lens from said first position to a second position in accordance with the displacement determined in step (c2).

22. An autofocus camera comprising:

a focussing lens having an image-receiving plane;

a two-dimensional image capture sensor disposed at said image receiving plane;

a controllable focusing lens displacement device coupled to said focussing lens, for controllably adjusting the position of said focusing lens relative to said two-dimensional image capture sensor disposed at said image-receiving plane;

a variable aperture through which light from a subject and directed by said focussing lens onto said two-dimensional image capture sensor disposed at said image-receiving plane passes;

a controllable aperture adjustment device coupled to said variable aperture for controllably adjusting the opening of said variable aperture; and a processor-controlled autofocus control system for automatically adjusting the position of said lens so as to cause an image of said subject to be focussed upon said two-dimensional image capture sensor, said autofocus control system being coupled to said two-dimensional image capture sensor, said controllable focussing lens displacement device and said controllable aperture adjustment device and being programmed to execute the following sequence of camera operations:

(a) operating said lens controllable focusing displacement device and said controllable aperture adjustment device to set the position of said lens at a first lens position and the opening of said variable aperture at a first aperture setting, and obtaining from said two-dimensional image capture sensor a first measurement of contrast in a first image of said subject formed thereon;

(b) operating said controllable aperture adjustment device to change the opening of said variable aperture, so as to effectively increase the depth of field in the image of said subject on said two-dimensional image capture sensor and obtaining a second measurement of contrast in a second image of said subject formed on said two-dimensional image capture sensor; and (c) controllably operating said controllable focussing lens displacement device so as to adjust the position of the focussing position of said focussing lens in accordance with the difference in said first and second measurements of contrast, so as to improve the sharpness of focus of the image of said subject formed on said two-dimensional image capture sensor.

23. An autofocus camera according to claim 22, wherein said processor-controlled autofocus control system is programmed to controllably operate said controllable focussing lens displacement device in step (c) by:
- (c1) deriving an estimate of the degree to which the image of said subject formed on said two-dimensional image capture sensor is out-of-focus in accordance with the difference in contrast measurements obtained in steps (a) and (b),
- (c2) determining a displacement of said focussing lens for effectively bringing the image of said subject into focus on said two-dimensional image capture sensor, and
- (c3) operating said controllable focussing lens displacement device so as to adjust the position of said lens from said first position to a second position in accordance with the displacement determined in step (c2).

24. An autofocus camera according to claim 22, wherein said processor-controlled autofocus control system is programmed to controllably operate said controllable focussing lens displacement device in step (c) by:
- (c1) measuring the difference in contrast measured in steps (a) and (b), and
- (c2) in response to the difference in contrast measured in step (c1) being greater than a first threshold value, operating said controllable focussing lens displacement device to adjust said focussing lens so as to improve the sharpness of focus of the image of said subject on said two-dimensional image capture sensor.

25. An autofocus camera according to claim 24, wherein said processor-controlled autofocus control system is programmed to controllably operate said lens controllable focussing displacement device in step (c) by the further steps of:
- (c3) in response to the degree of contrast measured in step (c1) being no greater than a second threshold value, determining whether the contrast measured in either of steps (a) or (b) is greater than a third threshold,
- (c4) in response to either of the contrasts measured in steps (a) and (b) being greater than said third threshold, terminating the controlled operation of said lens controllable focussing displacement device.

26. An autofocus camera according to claim 24, wherein said processor-controlled autofocus control system is programmed to controllably operate said lens controllable focussing lens displacement device in step (c) by the further steps of:
- (c3) in response to the degree of contrast measured in step (c1) being greater than a second threshold value, determining the direction in which said lens should be moved to bring said subject into focus upon said two-dimensional image capture sensor and operating said controllable focussing lens displacement device so as to move said lens by an amount which causes said subject to be focussed upon said two-dimensional image capture sensor.

27. An autofocus camera according to claim 26, wherein said processor-controlled autofocus control system is programmed to controllably operate said controllable focussing lens displacement device in step (c3) by the steps of:
- (c3-1) operating said controllable focussing lens displacement device to move said lens in a first direction to a second position, by an amount dependent upon the difference in contrast measured in step (c1),
- (c3-2) for said second position of said lens and said first aperture setting of said variable aperture, measuring the contrast in a third image of said subject formed on said two-dimensional image capture sensor, and
- (c3-3) operating said lens displacement device to move said lens either in said first direction or in a second direction opposite to said first direction, in dependence an improvement in the contrast measured in step (c3-3), to a third position at which said subject is brought into focus upon said two-dimensional image capture sensor.

28. An autofocus camera according to claim 24, wherein said first threshold is defined in accordance with a relationship between contrast and position error in the focussing position of said lens.

29. An autofocus camera according to claim 25, wherein said first and second thresholds are defined in accordance with a relationship between contrast and position error in the focussing position of said lens.

30. An autofocus camera according to claim 29, wherein said third threshold is defined in accordance with one or more parameters of said camera.

31. An autofocus camera according to claim 24, wherein said processor-controlled autofocus control system is programmed to controllably operate said controllable focussing lens displacement device in step (c) by the further steps of:
- (c3) in response to the degree of contrast measured in step (c1) being no greater than a second threshold value, determining whether the contrast measured in either of steps (a) or (b) is greater than a third threshold,
- (c4) in response to neither of the contrasts measured in steps (a) and (b) being greater than said third threshold, terminating said lens displacement device to move said controllable focussing lens to a default position and repeating steps (a) and (b) for said default position,
- (c5) measuring the difference in contrast measured in step (c4), and
- (c6) in response to the difference in contrast measured in step (c5) being no greater than said first and second threshold values and in response to either of the contrast values measured in step (c4) being greater than a third threshold, generating an error signal indicative of an inability to focus said lens upon said subject.

32. An autofocus camera comprising:
a focussing lens having an image-receiving plane;
a two-dimensional image capture sensor disposed at said image receiving plane;
a controllable focusing lens displacement device coupled to said focussing lens, for controllably adjusting the position of said focusing lens relative to said two-dimensional image capture sensor disposed at said image-receiving plane;
a variable aperture through which light from a subject and directed by said focussing lens onto said two-dimensional image capture sensor passes;

a controllable aperture adjustment device coupled to said variable aperture for controllably adjusting the opening of said variable aperture; and control means, coupled to said two-dimensional image capture sensor, said controllable focussing lens displacement device and said controllable aperture adjustment device, for automatically adjusting the position of said lens so as to cause an image of said subject to be focussed upon said two-dimensional image capture sensor by operating said controllable focussing lens displacement device and said controllable aperture adjustment device to set the position of said lens at a first lens position and the opening of said variable aperture at a first aperture setting, obtaining from said two-dimensional image capture sensor a first measurement of contrast in a first image of said subject formed thereon, operating said controllable aperture adjustment device to change the opening of said variable aperture, so as to effectively increase the depth of field in the image of said subject on said two-dimensional image capture sensor, obtaining a second measurement of contrast in a second image of said subject formed on said two-dimensional image capture sensor, and controllably operating said controllable focussing lens displacement device so as to adjust the position of the focussing position of said focussing lens in accordance with the difference in said first and second measurements of contrast.

33. An autofocus camera according to claim 32, wherein said control means includes means for controllably operating said controllable focussing lens displacement device by deriving an estimate of the degree to which the image of said subject formed on said two-dimensional image capture sensor is out-of-focus in accordance with the difference in contrast measurements, determining a displacement of said focussing lens for effectively bringing the image of said subject into focus on said two-dimensional image capture sensor, and operating said controllable focussing lens displacement device so as to adjust the position of said lens from said first position to a second position in accordance with the determined displacement.

* * * * *

UNITED STATES PATENT AND TRADEMARK OFFICE
CERTIFICATE OF CORRECTION

PATENT NO. : 5,170,202
DATED : December 8, 1992
INVENTOR(S) : Cynthia Sue Bell

It is certified that error appears in the above-indentified patent and that said Letters Patent is hereby corrected as shown below:

Column 11, line 9, insert left parenthesis;

Column 11, line 17, insert "said" between "in" and "first";

Column 15, line 40, insert "operated" before "said" and delete "operate" before "said";

Column 15, line 40, insert "controllable focussing" before "lens" and delete "controllable focussing" after "lens";

Column 15, line 51, insert "controllable focussing" before "lens" and delete "controllable focussing" after "lens";

Column 15, line 55, insert "controllable focussing" before "lens" and delete "controllable focussing" after "lens"

Signed and Sealed this

Twenty-sixth Day of October, 1993

Attest:

BRUCE LEHMAN

Attesting Officer       Commissioner of Patents and Trademarks